United States Patent [19]
Kubo

[11] Patent Number: 5,586,269
[45] Date of Patent: Dec. 17, 1996

[54] COMMUNICATION CONTROL DEVICE AND METHOD FOR AUTOMATICALLY DETERMINING A SELF-ADDRESS

[75] Inventor: Seiichi Kubo, Osaka, Japan

[73] Assignees: Matsushita Electric Industrial Co., Ltd., Osaka, Japan; N.V. Philips' Gloeilampenfabrieken, Eindhoven, Netherlands

[21] Appl. No.: 333,579

[22] Filed: Nov. 2, 1994

Related U.S. Application Data

[63] Continuation of Ser. No. 994,071, Dec. 21, 1992, abandoned, which is a continuation of Ser. No. 408,644, Sep. 18, 1989, abandoned.

[51] Int. Cl.$^6$ .............................. G06F 12/02; G06F 13/37; G06F 13/42; G06F 15/177
[52] U.S. Cl. ..................................... 395/250; 364/DIG. 1; 364/DIG. 2; 340/825.52; 340/825.07; 370/389
[58] Field of Search ....................................... 395/800, 200, 395/325, 725, 575, 500, 250, 827, 650, 200.1, 21, 200.01, 421.09, 775, 284, 183.19, 834, 200.02; 370/94.3, 85.1, 85.2, 85.4, 94.1, 85.7, 85.5, 92; 340/825.07, 825.52, 825.73, 825.56, 825.05; 364/DIG. 1, DIG. 2, 478; 455/34.1; 379/58

[56] References Cited

U.S. PATENT DOCUMENTS

| | | | |
|---|---|---|---|
| 4,253,087 | 2/1981 | Saal | 340/825.52 |
| 4,389,644 | 6/1983 | Abiko et al. | 340/825.52 |
| 4,390,969 | 6/1983 | Hayes | 340/825.52 |
| 4,689,786 | 8/1987 | Sidhu et al. | 370/85.1 |
| 4,761,646 | 8/1988 | Choquet et al. | 340/825.52 |
| 4,918,690 | 4/1990 | Markkula, Jr. et al. | 340/825.53 |
| 5,016,244 | 5/1991 | Massey, Jr. et al. | 370/94.3 |
| 5,148,389 | 9/1992 | Hughes | 395/800 |

Primary Examiner—Daniel H. Pan
Attorney, Agent, or Firm—Panitch, Schwarze, Jacobs & Nadel, P.C.

[57] ABSTRACT

A communication control device and method for an information transmission system which can set automatically its self-address. When the device is connected to the system, candidate values set as destination addresses are sequentially sent from the device to the system. If no response is obtained from the system even when a candidate value is sent to the system, the candidate value is set as the self-address of the device.

3 Claims, 7 Drawing Sheets

PR: PRIORITY CODE (11 BITS)

SA: SOURCE ADDRESS (11 BITS)

DA: DESTINATION CODE (11 BITS)

CC: CONTROL CODE (11 BITS)

BC: BYTE CODE (11 BITS)

DATA: DATA (11 X MAX. 256 BITS)

FCC: CHECK CODE (11 BITS)

DMY: DUMMY CODE (PERIOD EQUIVALENT TO 11 BITS)

ACK/NAK: ACK/NAK CODE (11 BITS)

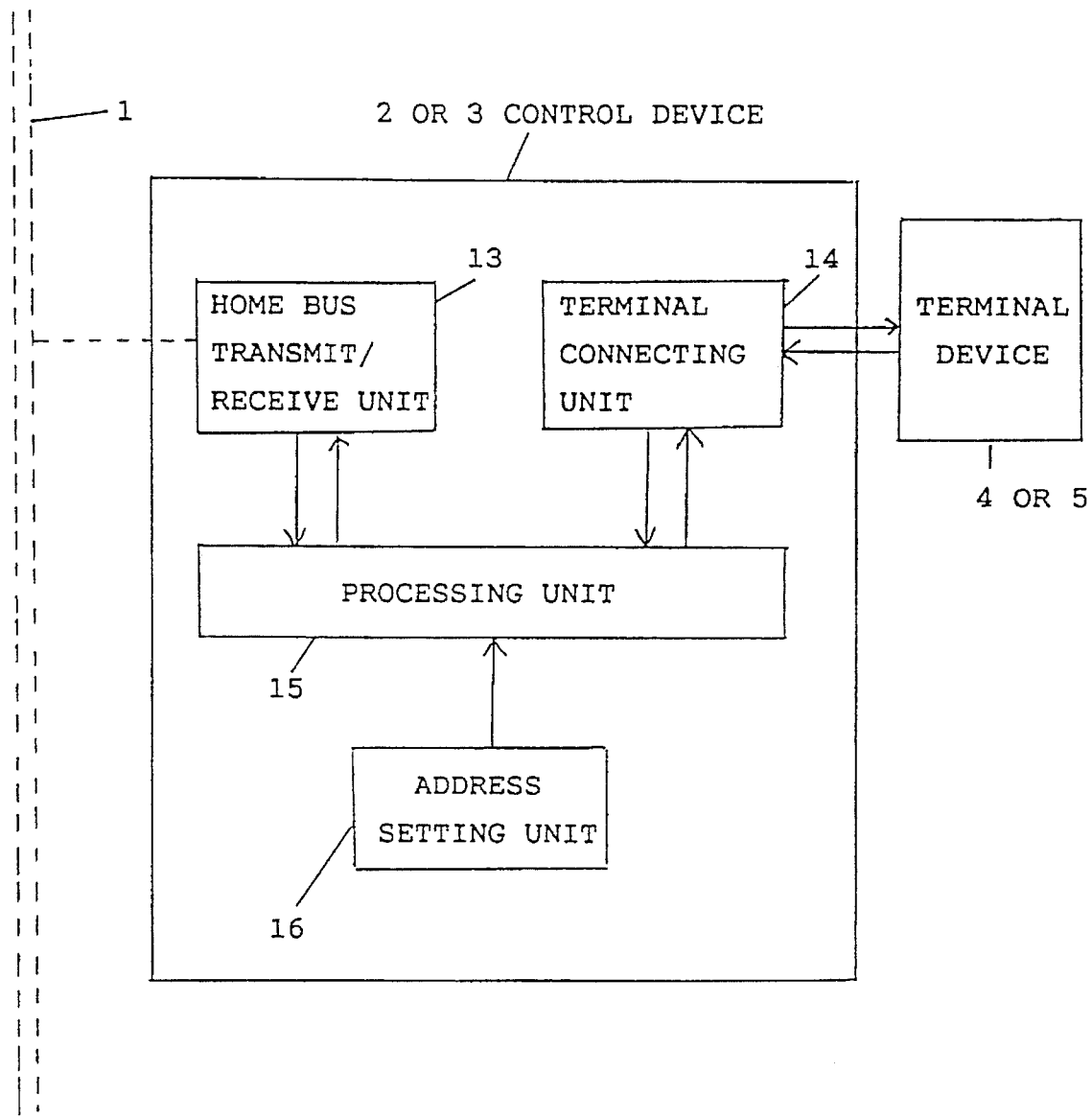

COMMUNICATION CONTROL DEVICE AND METHOD FOR AUTOMATICALLY DETERMINING A SELF-ADDRESS

This is a continuation of U.S. patent application Ser. No. 07/994,071, filed Dec. 21, 1992, now abandoned, which is a continuation of U.S. patent application Ser. No. 07/408,644, filed Sep. 18, 1989, now abandoned.

BACKGROUND OF THE INVENTION

1. Field of the Invention

This invention relates to a communication control device which is useful in an information transmission system and which can automatically decide its self-address, and a system for automatically deciding a self-address by using the device. Hereinafter; a communication control device is sometimes referred to as merely "a control device".

2. Description of the Prior Art

FIG. 1 illustrates a so-called home bus system which is a typical example of an information transmission system. The home bus system of FIG. 1 comprises: a home bus 1 which consists of information transmission lines for transmitting information messages; control devices 2 and 3 which communicate with each other through the home bus 1; and terminal devices 4 and 5 such as CRTs or sensors which are respectively connected to the control devices 2 and 3.

As shown in FIG. 2, the control devices 2 and 3 comprise a home bus transmit/receive unit 13, a terminal connecting unit 14, a processing unit 15, and an address setting unit 16. The transmit/receive unit 13 transmits and receives control signals on the home bus 1 in accordance with the prefixed signal format. The terminal connecting unit 14 is connected with the terminal device 4 or 5 to send and receive control signals to and from the terminal device 4 or 5. The processing unit 15 is connected to the units 13, 14 and 16 to control the transmission process. The address setting unit 16 sets a self-address which is an inherent and unique piece of data allocated to the control device 2 or 3, depending upon the kind of terminal device 4 or 5. When the terminal device 4 or 5 is a meter-reading terminal which reads an indicating value of a meter such as a wattmeter, the self-address must be selected from four values, $1C_H$, $9C_H$, $5C_H$ and $DC_H$.

In the system of FIG. 1, both the terminal devices 4 and 5 are meter-reading terminals, and the self-address of the control device 2 connected to the terminal device 4 and the control device 3 connected to the terminal device 5 are previously set to $1C_H$ and $9C_H$, respectively. When a further control device connected with another terminal device which is a meter-reading terminal is additionally connected to the home bus 1 of the system in which self addresses have been set as mentioned above, the self-address of the further control device is manually selected to be $5C_H$ or $DC_H$, so as not to overlap with the self-addresses $1C_H$ and $9C_H$ which have been already set in the system.

In a case where such a conventional control device is to be connected to a bus in an information transmission system, therefore, the operator must know self-addresses of control devices which have been already connected to the bus. Thereafter, he selects a value for the self-address of the newly connected control device so that it does not overlap with the self-addresses of the previously connected control devices, and then he sets the selected value as the self-address by operating DIP switches disposed in the newly connected control device. As described above, a conventional control device has disadvantages that the procedure of connecting a conventional control device to a bus is complicated and that there is a danger of erroneously setting a self-address.

SUMMARY OF THE INVENTION

The communication control device of this invention, which overcomes the above-discussed and numerous other disadvantages and deficiencies of the prior art, is useful in a transmission system in which a plurality of communication control devices are used, and comprises a first storage means for storing two or more candidate values which are adoptable as the self-address of said communication control device; a process means for selecting one of said candidate values as the self-address of said communication control device; and a second storage means for storing said selected value.

In a preferred embodiment, the process means comprises: a transmission means for sending one or more signals in which each of said candidate values is set to a destination address, one by one to said information transmission system; a detecting means for detecting whether a candidate value in each of said signals is used as a self-address or not; and a decision means for, when said detecting means detects a candidate value which is not used as a self-address, deciding said candidate value as the self-address of said communication control device.

In a preferred embodiment, the control device is connected with a terminal device, and said candidate values are selected in accordance with the kind of said terminal device.

In a preferred embodiment, the second storage means is a nonvolatile memory in which information is writable and readable.

According to the invention, a system for deciding a self-address of a communication control device used in an information transmission system can be provided. In the present invention, candidate values set as destination addresses are sequentially sent from said device to said system, a candidate value is decided as the self-address of said device when no response is obtained from said system even when said candidate value is sent to said system.

Thus, the invention described herein makes possible the objectives of:

(1) providing a communication control device which can automatically set its self-address;

(2) providing a communication control device which can automatically set its self-address when the control device is connected to a bus of an information transmission system;

(3) providing a communication control device which can set its self-address so that the self-address does not overlap with self-addresses of control devices which are previously connected to a bus of an information transmission system;

(4) providing a system for connecting a communication control device to a bus of an information transmission system in which the self-address of the control device can be automatically set; and (5) providing a system for connecting a communication control device to a bus of an information transmission system in which the self-address of the control device can be automatically set so that the self-address does not overlap with self-addresses of control devices which are previously connected to a bus of an information transmission system.

BRIEF DESCRIPTION OF THE DRAWINGS

This invention may be better understood and its numerous objects and advantages will become apparent to those skilled in the art by reference to the accompanying drawings as follows:

FIG. 2 is a block diagram of a conventional communication control device used in the home bus system of FIG. 1.

DESCRIPTION OF THE PREFERRED EMBODIMENTS

Figure 1:
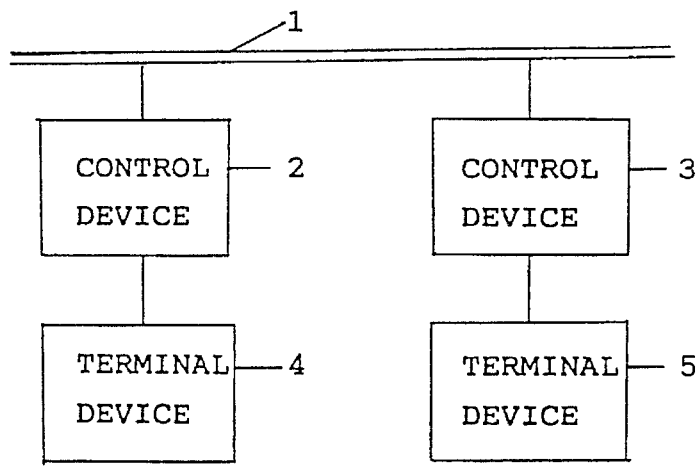
FIG. 1 shows a home bus system in which a communication control device according to the invention can be used.
Figure 3:
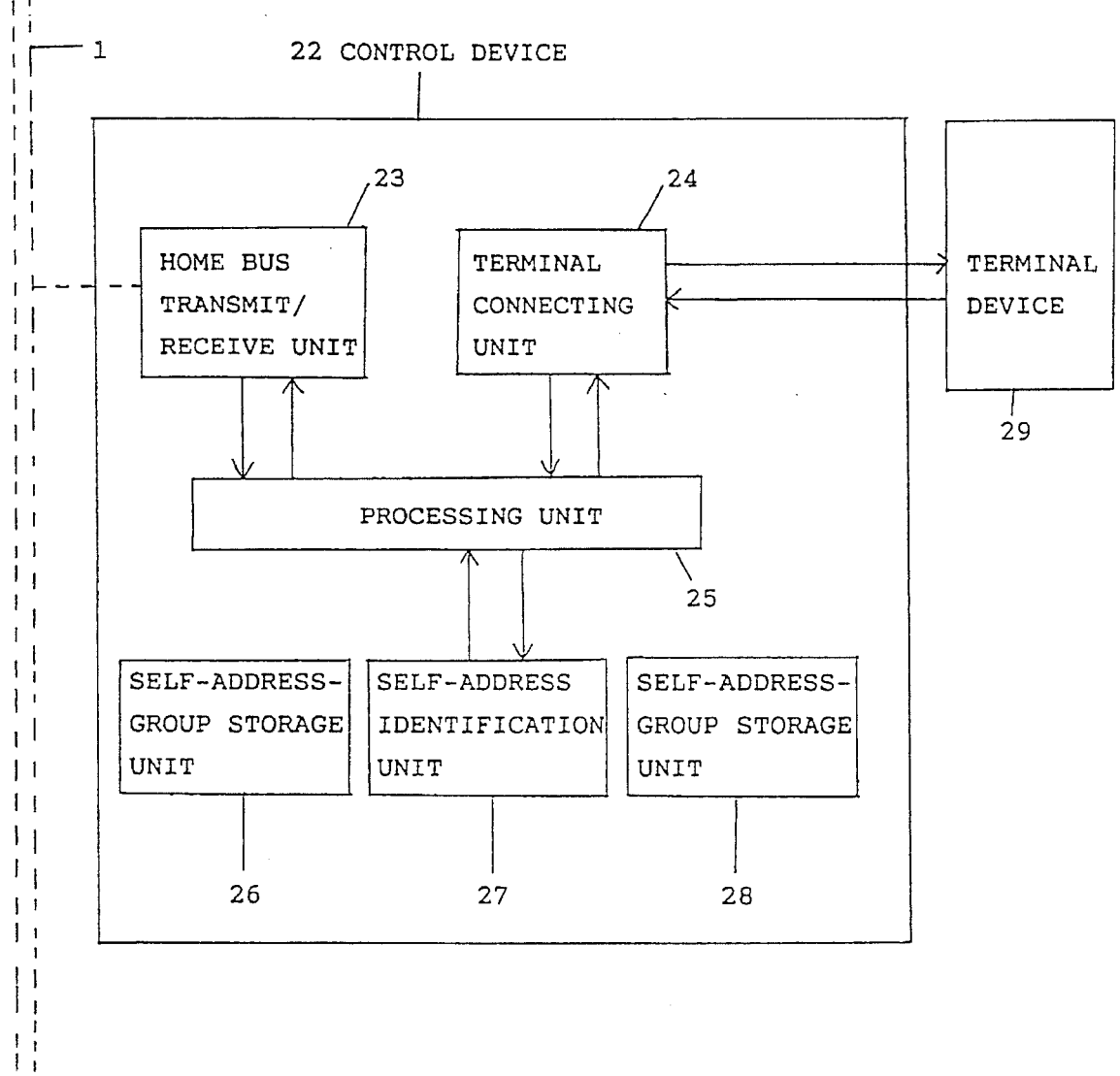
FIG. 3 is a block diagram of a communication control device according to the invention which is used in the home bus system of FIG. 1.

FIG. 3 illustrates a communication control device according to the invention which is used in a home bus system. The control device 22 shown in FIG. 1 can be connected to the home bus 1 of the information transmission system shown in FIG. 1, and can transmit and receive information in accordance with a protocol of the home bus 1. The control device 22 has functions of connecting a terminal device 29 to the home bus 1, controlling the terminal device 29, and collecting information from the terminal device 29. The control device 22 comprises a home bus transmit/receive unit 23, a terminal connecting unit 24, a processing unit 25, a self-address-group storage unit 26, a self-address identification unit 27, and a self-address storage unit 28.

The home bus transmit/receive unit 23 transmits and receives digital data packets from the home bus 1 in accordance with the transmission scheme of the home bus 1. The terminal connecting unit 24 sends control signals to the terminal device 29 and receives signals therefrom. The processing unit 25 controls the communication on the home bus 1, delivers to the transmit/receive unit 23 information which is to be transmitted to the home bus 1, and fetches from the unit 23 information which has been sent thereto. The processing unit 25 analyzes the fetched information. The self-address-group storage unit 26 stores all the values which are adoptable as the self-address of the terminal device 29 and selected from the values allotted according to the kind of the terminal device 29. The self-address storage unit 28 consists of a memory device such as an EEPROM or NVRAM which can be written and read at any time and can hold the stored data even when the power is off. The self-address identification unit 27 fetches address data from the self-address-group storage unit 26 in response to the request from the processing unit 25, and delivers it thereto. Also, the self-address identification unit 27 fetches data from the self-address storage unit 28, and writes data therein.

The way of automatically setting the self-address of the control device 22 which has the above-described structure will be described.

Figure 4:
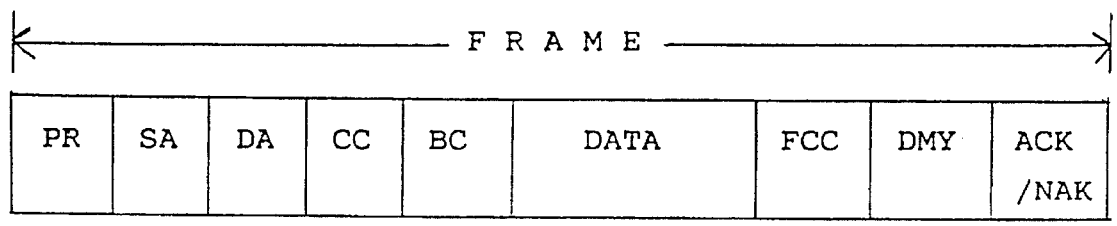
FIG. 4 illustrates the basic format of a control signal used in the home bus system of FIG. 1.

First, the basic format of a control signal used in a home bus system will be described with reference to FIG. 4. A control signal transmitted on a home bus consists of a priority code PR, a source address SA, a destination address DA, a control code CC, a byte count BC, a data DATA, and a frame check code FCC. If the control device specified by the destination address DA (receiving control device) is connected to the home bus and the communication is normally conducted, the receiving control device, after a dummy code DMY, sends the ACK (acknowledge) code to the home bus, and, if the communication is abnormal, the receiving control device sends the NAK (negative acknowledge) code to the home bus. In contrast, if the receiving control device is not connected to the home bus, neither the ACK nor NAK codes are sent to the home bus. This state is called "no response".

In the embodiment, the terminal device 29 connected to the control device 22 shown in FIG. 3 is a meter-reading terminal. The control device 22 is connected to the home bus system of FIG. 1 in which the self-addresses of the control devices 2 and 3 are already set $1C_H$ and $9C_H$, respectively.

All the candidate values (i.e., $1C_H$, $9C_H$, $5C_H$ and $DC_H$) adoptable as the self-address of a control device connected to a meter-reading terminal are previously stored in the self-address-group storage unit 26. Since the self-address of the control device 22 has not yet been decided, predetermined initial data is previously stored in the self-address storage unit 28.

After the control device 22 is connected to the home bus 1 and is driven, the processing unit 25 requests the self-address identification unit 27 to send the self-address assigned to the control device 22. Then, the self-address identification unit 27 reads the stored contents (i.e., the initial data) of the self-address storage unit 28, and judges that the self-address of the control device 22 has not yet been decided. The self-address identification unit 27 informs the processing unit 25 of this judgment.

Figure 5:
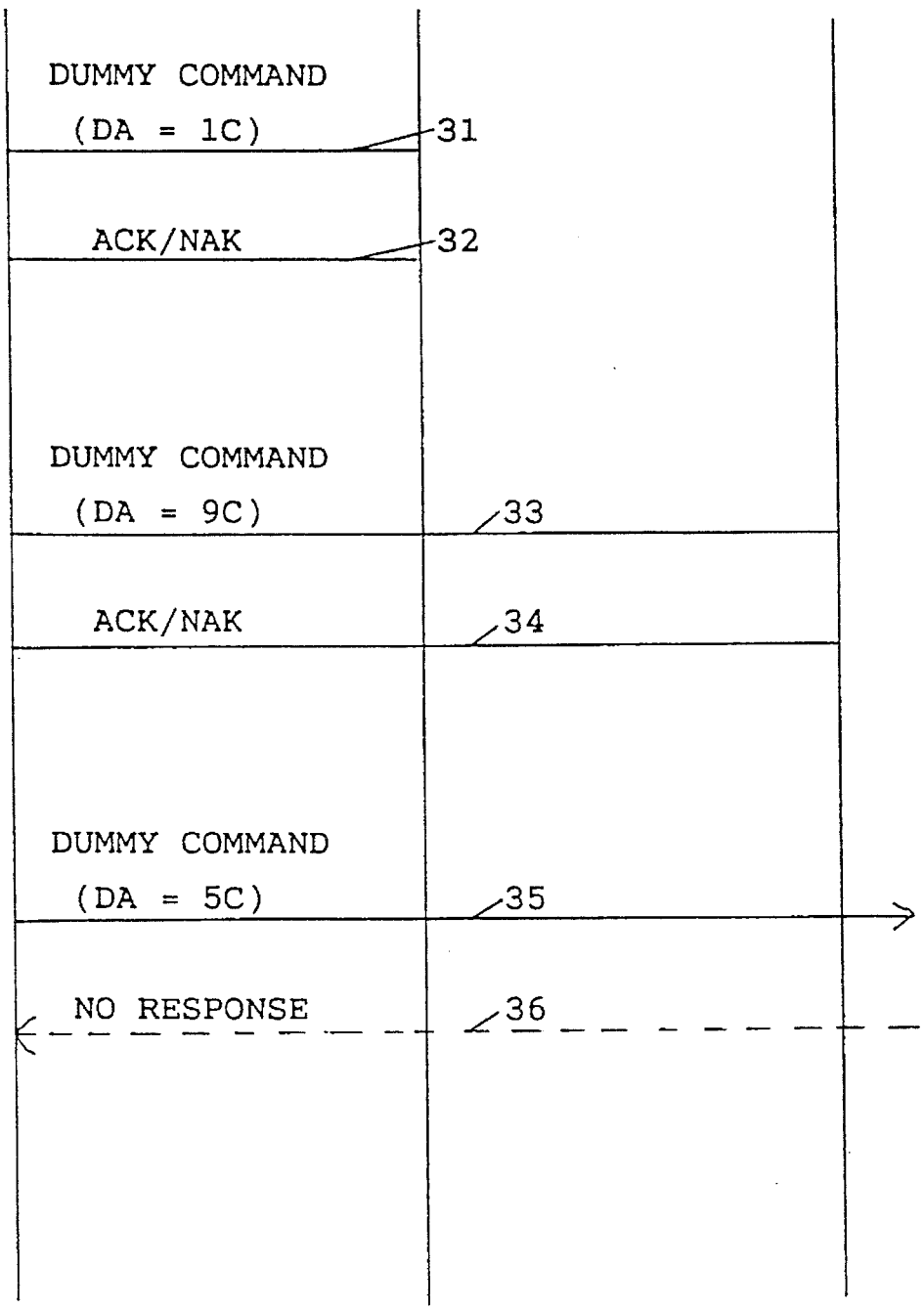
FIG. 5 is a diagram illustrating the transmission sequence of the control device of FIG. 2.

The processing unit 25 which has been informed of this judgment requests the self-address identification unit 27 to send a candidate value which is adoptable as the self-address of the control device 22. The self-address identification unit 27 reads the first candidate value $1C_H$ from the self-address-group storage unit 26, and sends it to the processing unit 25. The processing unit 25 which has received the first candidate value $1C_H$ generates a control signal having the format of FIG. 4 in which the first candidate value $1C_H$ is set as the destination address DA, and an arbitrary address code which is not used in the system is set as the source address SA. The thus generated special command (hereinafter, referred to as "dummy command") is then sent to the home bus 1 through the transmit/receive unit 23. This dummy command is shown with the reference numeral 31 in FIG. 5.

As mentioned above, the control device 2 having the self-address $1C_H$ has been already connected to the home bus 1. In response to the dummy command 31, hence, the processing unit 15 of the control device 2 sends an ACK/NAK code 32 (FIG. 5) onto the home bus 1. The processing unit 25 of the control device 22 receives the ACK/NAK code 32 via the home bus transmit/receive unit 23, and judges that a control device having the self-address $1C_H$ has been already connected to the home bus 1.

Thereafter, the processing unit 25 requests the self-address identification unit 27 to send another candidate value which is adoptable as the self-address of the control device 22. The self-address identification unit 27 reads the second candidate value $9C_H$ from the self-address-group storage unit 26, and sends it to the processing unit 25. The processing unit 25 which has received the second candidate value $9C_H$ generates a control signal having the format of FIG. 4 in which the second candidate value $9C_H$ is set as the destination address DA, and an arbitrary address code which is not used in the system is set as the source address SA. The thus generated dummy command 33 is then sent to the home bus 1 through the transmit/receive unit 23.

As mentioned above, the control device 3 having the self-address $9C_H$ has been already connected to the home bus 1. In response to the dummy command 31, hence, the processing unit 15 of the control device 2 sends another ACK/NAK code 34 onto the home bus 1. The processing unit 25 of the control device 22 receives the ACK/NAK code 34 via the home bus transmit/receive unit 23, and judges that a control device having the self-address $9C_H$ has been already connected to the home bus 1.

Then, the processing unit 25 requests the self-address identification unit 27 to send a further candidate value which is adoptable as the self-address of the control device 22. The self-address identification unit 27 reads the third candidate value $5C_H$ from the self-address-group storage unit 26, and sends it to the processing unit 25. The processing unit 25 which has received the third candidate value $5C_H$ generates a control signal having the format of FIG. 4 in which the third candidate value $5C_H$ is set as the destination address DA, and an arbitrary address code which is not used in the system is set as the source address SA. The thus generated dummy command 35 is then sent to the home bus 1 through the transmit/receive unit 23.

Since no control device having the self-address $5C_H$ is connected to the home bus 1, there is no response to the dummy command 35 in which the destination address DA is set to $5C_H$ (i.e., the state is no response 36). The processing unit 25 of the control device 22 detects the no response 36 to judge that there is not a control device having the self-address $5C_H$ and connected to the home bus 1. Then, the processing unit 25 informs the self-address identification unit 27 that the self-address of the control device 22 is $5C_H$. The self-address identification unit 27 which has received the information message performs the process of storing the self-address value $5C_H$ in the self-address storage unit 28, thereby setting the self-address of the control device 22 for $5C_H$.

In the embodiment, the self-address storage unit 28 consists of a nonvolatile memory device, which can retain information in the absence of power supply of the control device 22. Even when the power supply of the control device 22 in which the self-address has been set is once cut off while the device is connected to the home bus 1 and then the power supply is turned on again, therefore, it is not necessary to perform again the process of setting the self-address. This will be described in more detail. When the control device 22 is turned on again, the processing unit 25 requests the self-address identification unit 27 to read the value of the self-address. Then, the self-address identification unit 27 reads the information stored in the self-address storage unit 28. The information stored in the self-address storage unit 28 is not the initial data, but the value $5C_H$ which has been set as the self-address of the control device 22. Hence, the self-address identification unit 27 judges that the self-address of the control device 22 has been decided.

In this way, when the control device of this embodiment is connected to a home bus, the self-address of the control device can be automatically set by conducting communication processes on the home bus.

Figure 6:
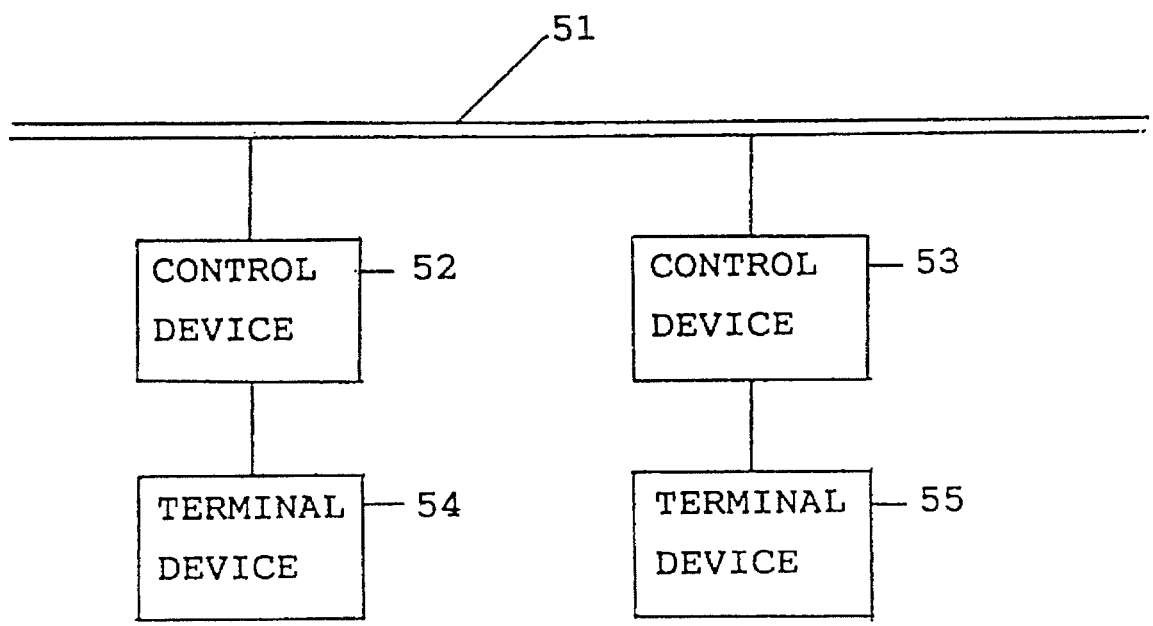
FIG. 6 shows a digital data bus system in which a communication control device according to the invention can be used.

A digital data bus system in which a communication control device according to the invention can be used is shown in FIG. 6. Hereinafter, a digital data bus is referred to as "$D^2B$". A $D^2B$ system is mainly used for transmitting information between audio and/or visual apparatuses. In the system of FIG. 6, control devices 52 and 53 are previously connected to a $D^2B$ 51 to communicate with each other via the $D^2B$. The control devices 52 and 53 are respectively connected with terminal devices 54 and 55 which are video monitors.

Figure 7:
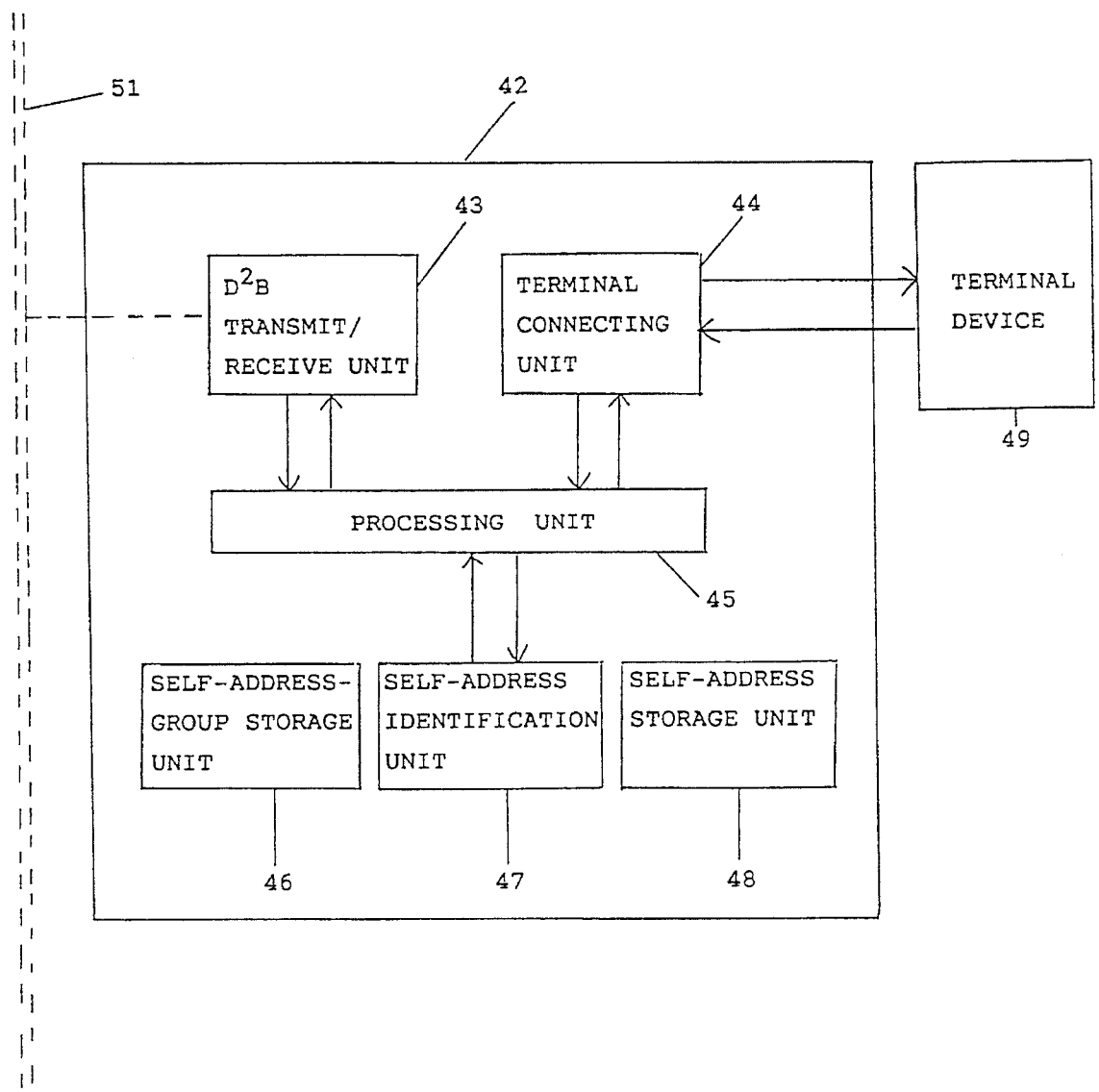
FIG. 7 is a block diagram of another communication control device according to the invention which is used in the digital data bus system of FIG. 6.

FIG. 7 illustrates another communication control device according to the invention. The control device 42 shown in FIG. 7 can be connected to the $D^2B$ 51 of the system of FIG. 6, and transmits and receives information in accordance with a protocol of the $D^2B$. The control device 42 has functions of connecting a terminal device 49 (a video monitor) to the $D^2B$ 51, controlling the terminal device 49, and collecting information from the terminal device 49. The control device 42 comprises a $D^2B$ transmit/receive unit 43, a terminal connecting unit 44, a processing unit 45, a self-address-group storage unit 46, a self-address identification unit 47, and a self-address storage unit 48.

The processing unit 45 controls the communication on the $D^2B$ 51, delivers to the transmit/receive unit 43 information which is to be transmitted to the $D^2B$ 51, and fetches from the transmit/receive unit 43 information which has been sent thereto. The processing unit 45 analyzes the fetched information. Further, the processing unit 45 sends control data to the terminal device 49, and fetches from the terminal connecting unit 44 information which has been sent from the terminal device 49, to analyze the fetched information. The other units 43, 44, 46 to 48 function in substantially the same manner as the units 23, 24, 26 to 28 of the control device of FIG. 3, and therefore the detailed description of these units is omitted.

Figure 8:
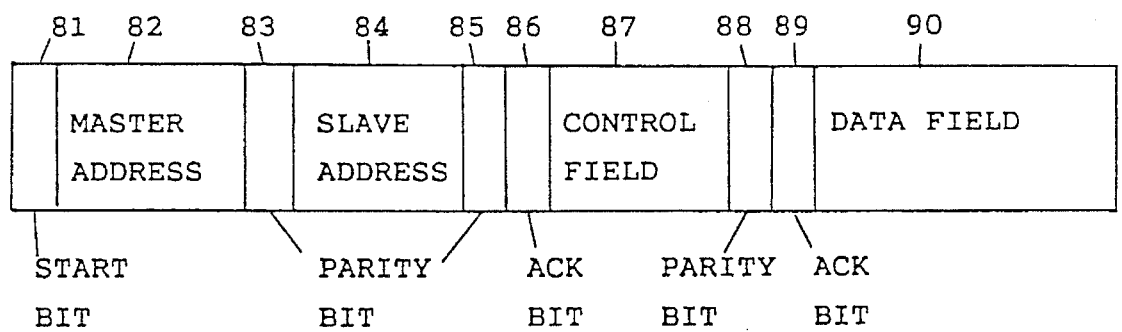
FIG. 8 illustrates the basic format of an information message used in the digital data bus system of FIG. 6.

FIG. 8 illustrates the basic format of an information message in a $D^2B$ system. An information message comprises: a start bit 81 indicating the beginning of the message; a master address 82 showing the address of the sending device; a parity bit 83 indicating the parity of the master address; a slave address 84 showing the address of a destination address; a parity bit 85 indicating the parity of the slave address; an ACK bit 86; a control field 87 indicating the attribute of the control field; a parity bit 88 indicating the parity of the control field; an ACK bit 89; and a data field 90 which contains information to be transmitted. When the transmission of each piece of data is performed normally or abnormally, the receiving control device sends the ACK code or NAK code in the ACK bit corresponding to the data. When the receiving control device is not connected to the $D^2B$, the state of the $D^2B$ is no response which is equivalent to the sate of the NAK.

Figure 9:
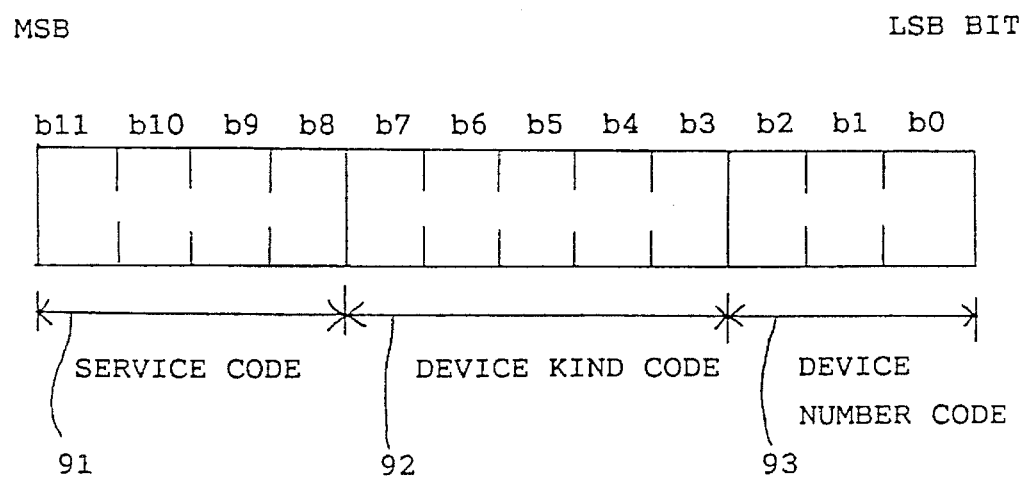
FIG. 9 illustrates the format of an address code used in the digital data bus system of FIG. 6.

The format of an address code used in a $D^2B$ system is shown in FIG. 9. An address consists of a service code 91 (4bits), a device kind code 92 (5 bits), and a device number code 93 (3bits). The service code 91 indicates the kind of the function to be performed by the terminal device (e.g., an audio and visual controller (AVC), housekeeping, etc. ). The device kind code 92 shows the kind of the terminal device connected to the control device. The device number code 93 is a number which is used for discriminating control devices when a plurality of control devices having the same service code and device kind code are connected to a $D^2B$.

The way of setting the self-address using the control device 42 which has the above-described structure will be described. In this case, the terminal device 49 connected to the control device 42 is a video monitor. The control device 42 is connected to the D²B 51 shown in FIG. 6. As described above, the control devices 52 and 53 are previously connected to the D²B 51. The terminal devices 54 and 55 which are connected respectively to the control devices 52 and 53 are identical with the terminal device in service (AVC) and kind (video monitor).

In the D²B system of FIG. 6, the service code of an AVC is 0001(bit), the device kind code of a video monitor is 0000(bit), the device number of the control device 52 is 000(bit), and the device number of the control device 53 is 001(bit ), resulting in that the self-address of the control device 52 is $100_H$ and that of the control device 53 is $101_H$.

After the control device 42 is connected to the D²B 51 and is driven, the processing unit 45 requests the self-address identification unit 47 to send the self-address assigned to the control device 42. Then, the self-address identification unit 47 reads the stored contents of the self-address storage unit 48. Since the self-address of the control device 42 has not yet been decided, a predetermined initial data previously stored in the self-address storage unit 48 is read out. The self-address identification unit 47 judges that the self-address of the control device 42 has not yet been decided, and informs the processing unit 45 of this judgment.

The processing unit 45 which has been informed of this judgment requests the self-address identification unit 47 to send a candidate value which is adoptable as the self-address of the control device 42. In this embodiment, the self-address-group storage unit 46 stores all the candidate values (i.e., $100_H$–$107_H$) which are adoptable as the self-address of a control device when the service and kind of a connected terminal device are an AVC and video monitor, respectively. Then, the self-address identification unit 47 reads the first candidate value $100_H$ from the self-address-group storage unit 46, and sends it to the processing unit 45. The processing unit 45 which has received the first candidate value $100_H$ generates an information message having the format of FIG. 8 in which the first candidate value $100_H$ is set as the slave address 84 and an arbitrary address code which is not used in the system is set as the master address 82. The contents of the thus generated special command (dummy command) are then sequentially sent to the D²B 51 through the transmit/receive unit 43, beginning with the start bit 81.

As mentioned above, the control device 52 having the self-address $100_H$ has been already connected to the D²B 51. In response to the dummy command, hence, the control device 52 sends an ACK code to the ACK bit 86 for the slave address 84. The processing unit 45 of the control device 42 detects the ACK code via the D²B transmit/receive unit 43 to judge that a control device having the self-address $100_H$ has been already connected to the D²B 51.

Thereafter, the control device 42 sets the second candidate value $101_H$ as the slave address 84 of the dummy command, and sends the new dummy command to the D²B 51. The control device 53 having the self-address $101_H$ has been already connected to the D²B 51, and, therefore, the control device 52 sends an ACK code as the ACK bit 86. The processing unit 45 of the control device 42 receiving the ACK code judges that a control device having the self-address $101_H$ has been already connected to the D²B 51.

The control device 42 further sets the third candidate value $102_H$ as the slave address 84 of the dummy command, and sends the new dummy command to the D²B 51. Since no control device having the self-address $102_H$ is connected to the D²B 51, the ACK bit 86 for the slave address 84 is no response. This is detected by the processing unit 45 of the control device 42. The processing unit 45 judges that there is not a control device having the self-address $102_H$ in the system of FIG. 6, and decides that the self-address of the control device 42 is $102_H$. Then, the control device 42 makes the self-address identification unit 47 to write the self-address value $102_H$ into the self-address storage unit 48. Thereby, the self-address of the control device 42 is set for $102_H$ so that it does not overlap with those of the control devices 52 and 53.

In this way, when the control device of this embodiment is connected to a D²B, the self-address of the control device can be automatically set by conducting communication processes on the D²B.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

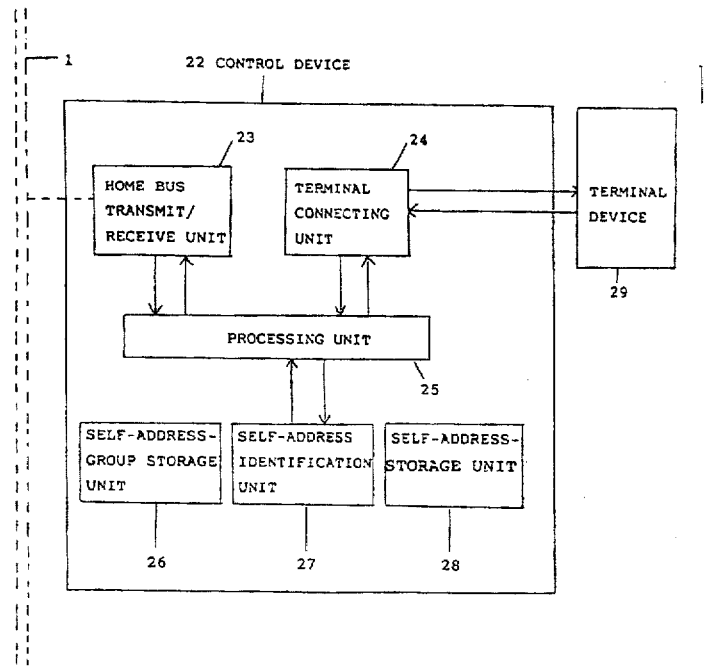

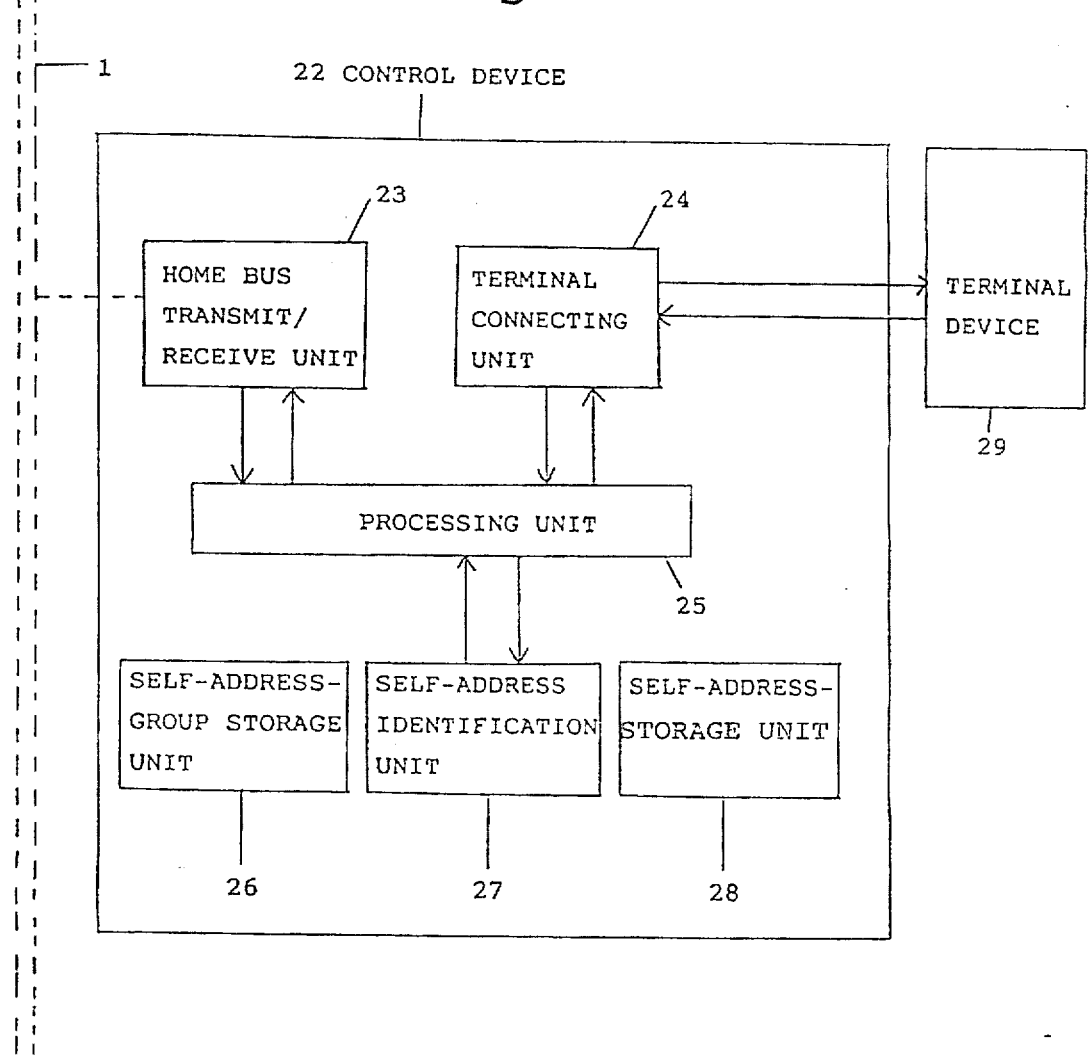

What is claimed is:

1. A communication control device for an information transmission system in which a plurality of communication control devices are used, comprising:

a first storage means for storing all of a plurality of candidate values which are adoptable as a self-address of said communication control device;

a process means for selecting one of said candidate values which is unused by another device in the system as the self-address of said communication control device; and a second storage means for initially storing an initial value to indicate that the self-address of said communication control device has not been selected, and for subsequently storing the selected candidate value, wherein said process means comprises:

a judgment means for judging whether said initial value is stored in said second storage means;

a transmission means for sending to said information transmission system at least one signal in which each of said candidate values is set to a destination address in accordance with a pre-ordered sequence, one candidate value at a time, when said judgment means judges that said initial value is stored in said second storage means; and a decision means for selecting a candidate value to be the self-address of said communication control device, if no response is obtained from said information transmission system.

2. A communication control device according to claim 1 wherein said control device is connected with a terminal device of a particular type and said candidate values are selected in accordance with the particular type of said terminal device.

3. A communication control device according to claim 1 wherein said second storage means is a nonvolatile memory in which information is writable and readable.

* * * * *

UNITED STATES PATENT AND TRADEMARK OFFICE
CERTIFICATE OF CORRECTION

PATENT NO.    : 5,586,269

DATED         : December 17, 1996

INVENTOR(S)   : Seiichi Kubo

It is certified that error appears in the above-identified patent and that said Letters Patent is hereby corrected as shown below:

On the title page, showing the illustrative figure 3, should be deleted and substitute therefor the attached title page.

The drawing sheet consisting of Fig 3, should be deleted and replaced with the drawing sheet, consisting of Fig. 3.

Signed and Sealed this

Twenty-seventh Day of May, 1997

*Attest:*

BRUCE LEHMAN

*Attesting Officer*   *Commissioner of Patents and Trademarks*

United States Patent [19]

Kubo

[11] Patent Number: 5,586,269
[45] Date of Patent: Dec. 17, 1996

[54] COMMUNICATION CONTROL DEVICE AND METHOD FOR AUTOMATICALLY DETERMINING A SELF-ADDRESS

[75] Inventor: Seiichi Kubo, Osaka, Japan

[73] Assignees: Matsushita Electric Industrial Co., Ltd., Osaka, Japan; N.V. Philips' Gloeilampenfabrieken, Eindhoven, Netherlands

[21] Appl. No.: 333,579

[22] Filed: Nov. 2, 1994

Related U.S. Application Data

[63] Continuation of Ser. No. 994,071, Dec. 21, 1992, abandoned, which is a continuation of Ser. No. 408,644, Sep. 18, 1989, abandoned.

[51] Int. Cl.[6] ........................... G06F 12/02; G06F 13/37; G06F 13/42; G06F 15/177
[52] U.S. Cl. ........................... 395/250; 364/DIG. 1; 364/DIG. 2; 340/825.52; 340/825.07; 370/389
[58] Field of Search ........................... 395/800, 200, 395/325, 725, 575, 500, 250, 827, 650, 200.1, 21, 200.01, 421.09, 775, 284, 183.19, 834, 200.02; 370/94.3, 85.1, 85.2, 85.4, 94.1, 85.7, 85.5, 92; 340/825.07, 825.52, 825.73, 825.56, 825.05; 364/DIG. 1, DIG. 2, 478; 455/34.1; 379/58

[56] References Cited

U.S. PATENT DOCUMENTS

| | | | |
|---|---|---|---|
| 4,253,087 | 2/1981 | Saal | 340/825.52 |
| 4,389,644 | 6/1983 | Abiko et al. | 340/825.52 |
| 4,390,969 | 6/1983 | Hayes | 340/825.52 |
| 4,689,786 | 8/1987 | Sidhu et al. | 370/85.1 |
| 4,761,646 | 8/1988 | Choquet et al. | 340/825.52 |
| 4,918,690 | 4/1990 | Markkula, Jr. et al. | 340/825.53 |
| 5,016,244 | 5/1991 | Massey, Jr. et al. | 370/94.3 |
| 5,148,389 | 9/1992 | Hughes | 395/800 |

*Primary Examiner*—Daniel H. Pan
*Attorney, Agent, or Firm*—Panitch, Schwarze, Jacobs & Nadel, P.C.

[57] ABSTRACT

A communication control device and method for an information transmission system which can set automatically its self-address. When the device is connected to the system, candidate values set as destination addresses are sequentially sent from the device to the system. If no response is obtained from the system even when a candidate value is sent to the system, the candidate value is set as the self-address of the device.

3 Claims, 7 Drawing Sheets